United States Patent
Schultz

(10) Patent No.: US 11,278,978 B2
(45) Date of Patent: Mar. 22, 2022

(54) PATTERN BONDED FINNED COLD PLATE

(71) Applicant: International Business Machines Corporation, Armonk, NY (US)

(72) Inventor: Mark D. Schultz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 16/448,574

(22) Filed: Jun. 21, 2019

(65) Prior Publication Data

US 2020/0400387 A1    Dec. 24, 2020

(51) Int. Cl.
| | | |
|---|---|---|
| *B23K 1/00* | (2006.01) | |
| *B23K 1/20* | (2006.01) | |
| *B23K 3/06* | (2006.01) | |
| *F28F 3/04* | (2006.01) | |

(52) U.S. Cl.
CPC ............ *B23K 1/203* (2013.01); *B23K 1/0012* (2013.01); *B23K 1/0016* (2013.01); *B23K 3/0638* (2013.01); *F28F 3/048* (2013.01); *F28F 2275/04* (2013.01)

(58) Field of Classification Search
None
See application file for complete search history.

(56) References Cited

U.S. PATENT DOCUMENTS

| | | | | |
|---|---|---|---|---|
| 3,106,016 A | * | 10/1963 | Warren | B23K 1/005 228/181 |
| 4,451,540 A | * | 5/1984 | Baird | B23K 1/19 174/535 |
| 5,761,811 A | | 6/1998 | Ito | |
| 6,085,830 A | * | 7/2000 | Mashiko | B22D 17/24 165/185 |
| 6,328,529 B1 | | 12/2001 | Yamaguchi et al. | |
| 7,262,966 B2 | * | 8/2007 | Liao | H01L 23/427 257/E23.088 |
| 8,115,302 B2 | | 2/2012 | Andry et al. | |
| 8,397,796 B2 | * | 3/2013 | Thayer | F28F 3/12 165/80.4 |

(Continued)

FOREIGN PATENT DOCUMENTS

| | | | |
|---|---|---|---|
| JP | 2001057489 A | * | 2/2001 |
| JP | 2015050287 A | * | 3/2015 |

(Continued)

*Primary Examiner* — Devang R Patel
(74) *Attorney, Agent, or Firm* — Daniel Morris; Otterstedt, Wallace & Kammer, LLP

(57) ABSTRACT

An apparatus includes a fin pack of parallel plates that protrude from a base, a lid attachable to the fin pack opposite the base, and a brazing material painted onto the lid only in a plurality of wettable regions. The lid is positioned against the fin pack, opposite the base, with portions of the plurality of regions contacting edges of the parallel plates. The lid is brazed to the fin pack without intrusion of the brazing material between the parallel plates. This is accomplished by obtaining a lid to be attached to a fin pack of parallel plates that protrude from a base, painting the lid with the brazing material only in a plurality of wettable regions, positioning the lid against the fin pack, opposite the base, with portions of the plurality of regions contacting edges of the parallel plates, and brazing the lid to the fin pack.

3 Claims, 6 Drawing Sheets

(56) References Cited

U.S. PATENT DOCUMENTS

| | | | | |
|---|---|---|---|---|
| 2005/0252951 A1* | 11/2005 | Liao | ................ | B23K 1/008 |
| | | | | 228/245 |
| 2006/0124281 A1* | 6/2006 | Rosenfeld | ............. | F28D 15/046 |
| | | | | 165/104.26 |
| 2006/0219388 A1* | 10/2006 | Terakado | ................ | F28F 3/12 |
| | | | | 165/80.4 |
| 2010/0180441 A1* | 7/2010 | Otsuka | ................ | B23K 1/0012 |
| | | | | 29/890.054 |
| 2016/0001388 A1* | 1/2016 | Oohiraki | ............. | B23K 1/0016 |
| | | | | 228/122.1 |
| 2017/0038150 A1 | 2/2017 | Kalbacher et al. | | |

FOREIGN PATENT DOCUMENTS

| | | | |
|---|---|---|---|
| JP | 2018081997 A | * | 5/2018 |
| JP | 2019160832 A | * | 9/2019 |

* cited by examiner

PATTERN BONDED FINNED COLD PLATE

STATEMENT REGARDING FEDERALLY SPONSORED RESEARCH OR DEVELOPMENT

This invention was made with Government support under Contract No.: B604142 awarded by Department of Energy. The Government has certain rights in this invention.

BACKGROUND

The present invention relates to the electrical, electronic, and computer arts, and more specifically, to the manufacturing of cooling equipment for computer systems.

With the increasing performance of computer systems, the power dissipation of these systems continues to increase. This trend poses cooling challenges at the module, system, rack and data center levels.

In some applications, computer processors and their associated electronics (e.g., memory, disk drives, power supplies, etc.) are packaged in removable drawer configurations stacked within an electronics rack or frame comprising information technology (IT) equipment. In other cases, the electronics may be in fixed locations within the rack or frame. Conventionally, the components have been cooled by air moving in parallel airflow paths, usually front-to-back, impelled by one or more air moving assemblies (e.g., axial or centrifugal fans). In the case of high power computing systems, liquid heat exchangers, also known as cold plates, can be used. These liquid heat exchangers can transfer heat up to about four times better than an equal mass of air. This enables improved cooling provided with a smaller system.

Typically, a cold plate base rests against a heat generating component that dissipates heat. Many such cold plates include a fin pack within a plenum that is sealed by a lid. The fin pack connects to the base of the cold plate and transfers heat from the base into a coolant that flows through the fin pack under the lid. Typically, the lid is bonded to the base and to the fin pack by brazing.

SUMMARY

Principles of the invention provide techniques for a pattern bonded finned cold plate. In one aspect, an exemplary method includes obtaining a lid to be attached to a fin pack of parallel plates that protrude from a base, and painting the lid with the brazing material only in a plurality of wettable regions.

In another aspect, an exemplary apparatus includes a fin pack of parallel plates that protrude from a base, a lid to be attached to the fin pack opposite the base, and a brazing material that is painted onto the lid only in a plurality of wettable regions. The lid is positioned against the fin pack, opposite the base, with portions of the plurality of regions contacting edges of the parallel plates. The lid is brazed to the fin pack without intrusion of the brazing material between the parallel plates.

In view of the foregoing, techniques of the present invention can provide substantial beneficial technical effects. For example, one or more embodiments provide one or more of:

A finned cold plate with a lid that is attached at low cost to a fin pack of the cold plate, sealing the cold plate and attaching the fin tops to the lid without excess brazing material blocking liquid flow through the fin pack.

These and other features and advantages of the present invention will become apparent from the following detailed description of illustrative embodiments thereof, which is to be read in connection with the accompanying drawings. Where similar reference characters are used in separate drawings, but not described separately in detail, it is assumed that the corresponding components are similar in nature.

DETAILED DESCRIPTION

Finned cold plates typically have been manufactured by machining rows of fins into a fin pack or plenum, then soldering or brazing a lid to a top surface of the fin pack. This typically has been done using a large area of solder/braze paste or a solder preform, which typically worked well when the fins were far enough apart to not cause capillary wicking of solder/braze into gaps between the fins. For cold plates having a tighter fin pitch, capillary wicking is a problem. In other cases, even a wide pitch fin pack can allow large areas of braze/solder to "ball-up," putting a large amount of material in one area and insufficient material in others.

Accordingly, at least one aspect of the invention overcomes problems associated with conventional solder preforms or large area paste layers, including ball-up and capillary wicking. Some aspects of the invention are directed to providing solder in small regions on the surface of a lid that contacts the fin pack to achieve mechanical bonding while mitigating ball-up or capillary wicking.

Figure 1:
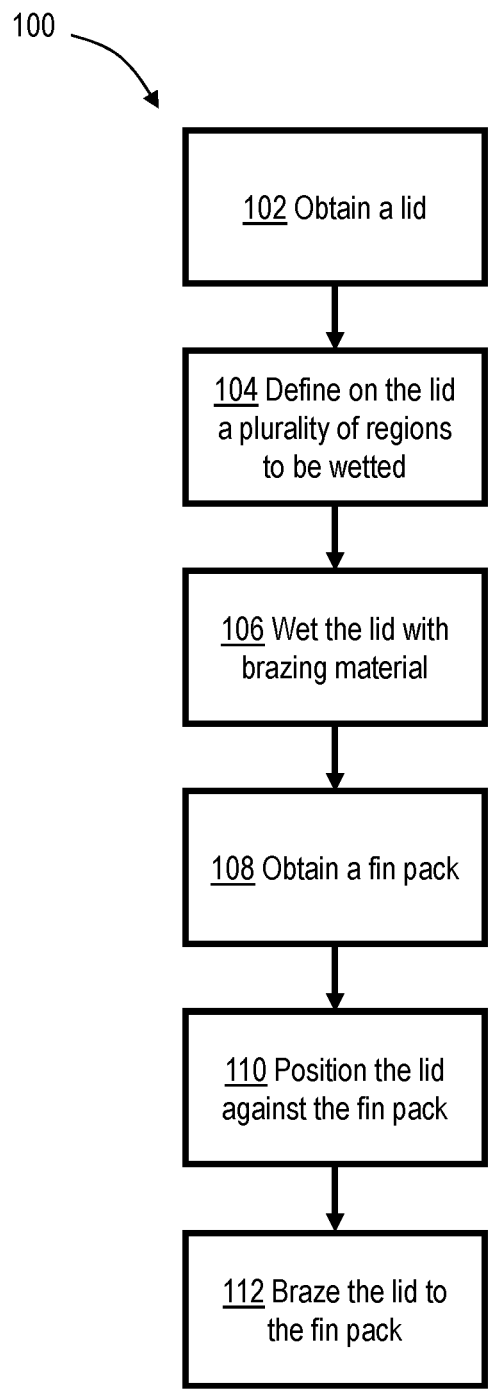
FIG. 1 depicts in a flowchart steps of a method for attaching a lid to a fin pack without ball-up or capillary wicking of braze material into the fin pack, according to an exemplary embodiment.

One or more embodiments of the invention provide a method 100 as depicted in FIG. 1. The method 100 includes at 102 obtaining a lid to be attached to a fin pack of parallel plates that protrude from a base. At 104, the method 100 includes defining on the lid a plurality of wettable regions to be painted with a brazing material. At 106, painting the lid with the brazing material only in the plurality of wettable regions. In one or more embodiments, the wettable regions are defined by paste screening of the brazing material using a cutout template. In one or more embodiments, the paste screening process can be reinforced by application of a non-wetting agent at step 104. The non-wetting agent could be, for example, a polymer, another non-wetting metal, a separate oxide, oxidized copper, ink, paint. However, in one or more embodiments the step of marking the lid with the non-wetting agent can be omitted. Instead, the lid could be mechanically treated, e.g. by scoring or embossing, to provide regions that the brazing material will not wet when it is melted. In one or more embodiments, the method 100 further includes at 108, obtaining the fin pack of parallel plates protruding perpendicularly from the base; at 110, positioning the lid against the fin pack, opposite the base, with portions of the plurality of wettable regions contacting edges of the parallel plates; and at 112, brazing the lid to the fin pack, without intrusion of the brazing material between the parallel plates. In this context, "intrusion" of the brazing material would occlude more than about 10% of the fin height, e.g., leaving open less than about 90% of the fin height.

It should be understood that wetting has specific meaning in the context of brazing, and is associated with the actual brazing process. Wetting does not occur until the braze material melts. According to one or more embodiments of the present invention, the braze material is painted, for example, in the case of a paste or a pre-form, without wetting. According to some embodiments, non-wetting material is applied to the surface to be brazed and limits (or prevents) braze material movement during brazing. According to some embodiments, the non-wetting material does not affect the process at the painting steps.

Figure 2:
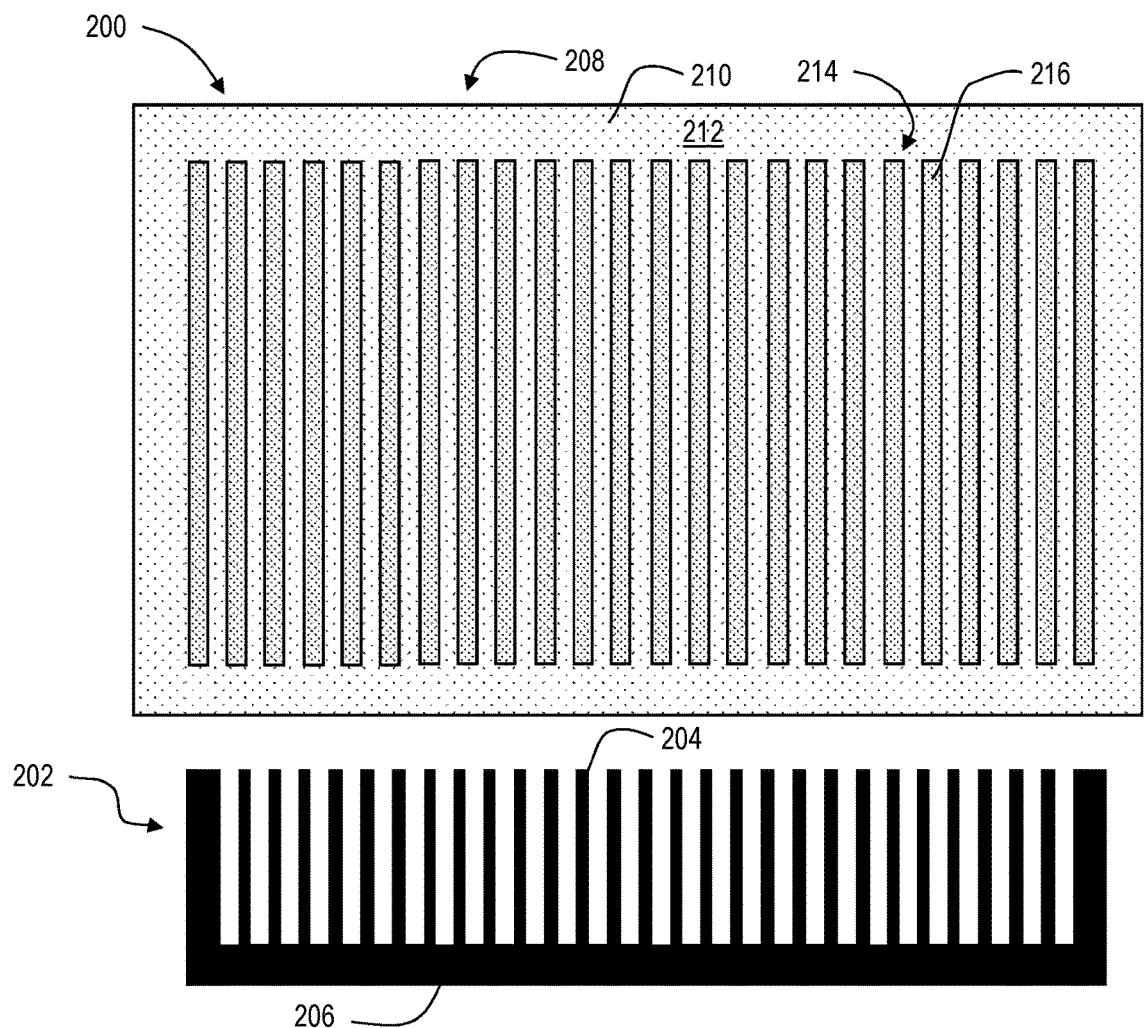
FIG. 2 depicts a bottom schematic view of a lid and a side schematic view of a fin pack to be attached to the lid, in order to complete an apparatus according to an exemplary embodiment.
Figure 3:
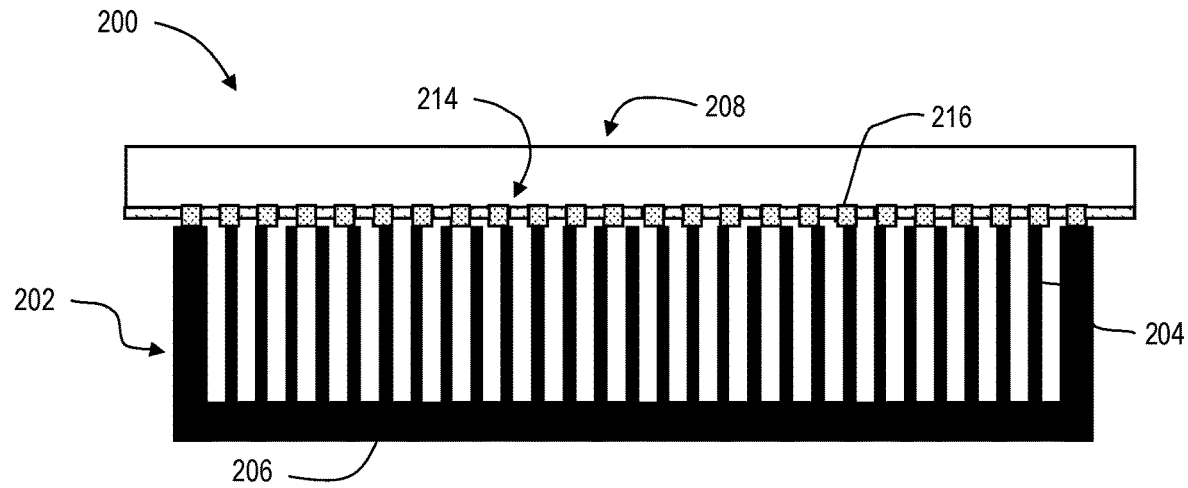
FIG. 3 depicts in a side schematic view an assembled state of the apparatus of FIG. 2.

Thus, as depicted in FIGS. 2 and 3, an apparatus 200 includes a fin pack 202 of parallel plates or fins 204 that protrude from a base 206 configured for arrangement on (or in conductive communication with) a heat-generating component, a lid 208 to be attached to the fin pack 202 opposite the base 206, and "negative" regions 210 that are patterned on a surface 212 of the lid 208. The negative regions 210 are disposed between a plurality of wettable regions 214 that are to be painted with a brazing material 216. In one or more embodiments, the wettable regions 214 are non-contiguous. The apparatus 200 also includes the brazing material 216 in the wettable regions 214. According to at least one embodiment, the wettable regions 214 are defined by paste screening the brazing material 216 onto the surface 212. When the brazing material 216 is heated to melting, it wets the surface 212 only in the plurality of wettable regions 214. In some embodiments, the negative regions 210 of the surface 212 can be formed by mechanical patterning, in which the surface 212 is roughened or embossed to prevent wetting by the molten brazing material 216. In some embodiments, the negative regions 210 can be made by marking the surface 212 with a non-wetting agent, which forms a larger contact angle with the molten brazing material than does the unmarked surface 212. In one or more embodiments, the non-wetting agent is selected from a group consisting of: a polymer, oxide, ink, or paint.

It should be understood that paste screening can be used alone to deposit the brazing material 216 in the wettable regions 214, or in some embodiments paste screening can be used in combination with either or both of the non-wetting agent and/or a mechanical patterning process that defines the negative regions 210 of the surface 212.

FIG. 2 depicts a bottom plan view of the lid 208 above a side view of the fin pack 202. FIG. 3 depicts a side view of the complete apparatus 200 with the lid 208 positioned against the fin pack 202, opposite the base 206, and with the brazing material 216 contacting edges of the parallel fins or plates 204. The lid 208 is brazed to the fin pack 202 without intrusion of the brazing material 216 between the parallel plates. In this context, "without intrusion of the brazing material" means less than about 10% intrusion, that is, more than about 90% of the space between the fins remains open to flow after the lid has been attached to the fin pack by brazing. As discussed above with reference to FIG. 1, in one or more embodiments the non-wetting agent may be omitted and the brazing material 216 can be deposited on the lid using a different technique.

Figure 4:
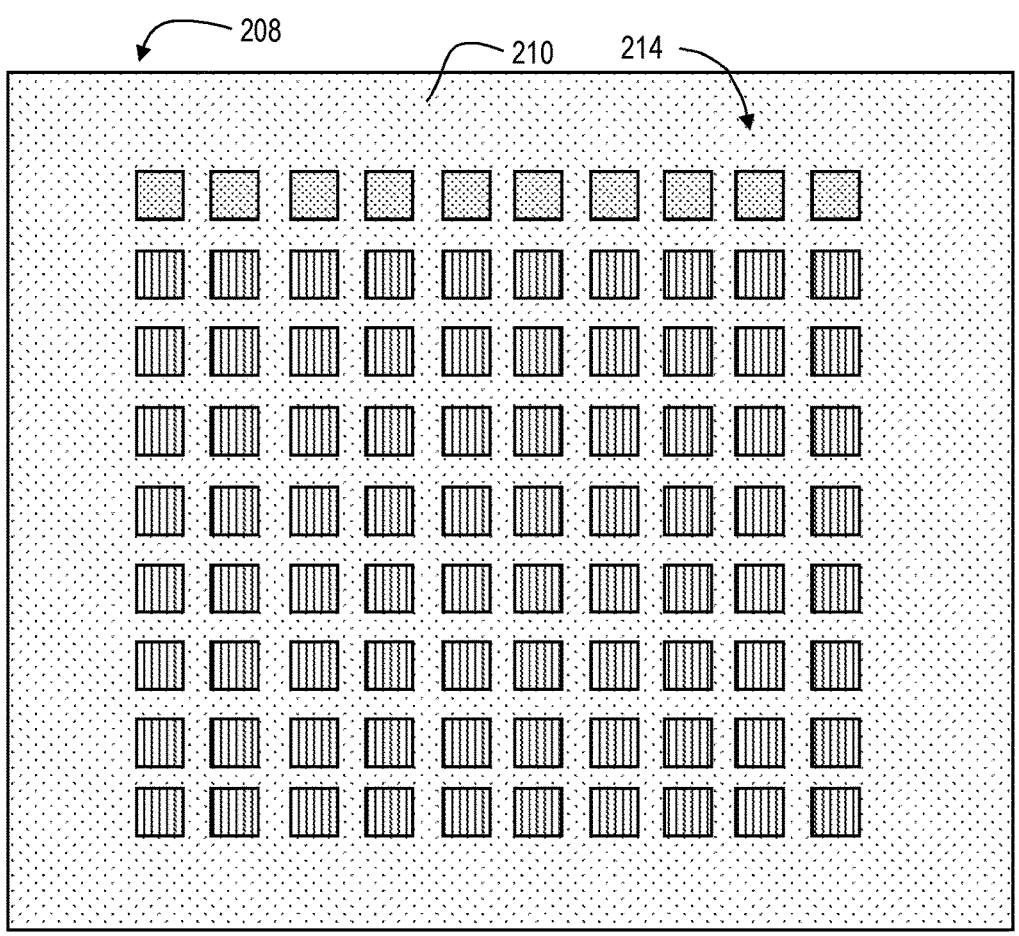
FIG. 4 depicts in a bottom schematic view another exemplary embodiment of a lid for use in the apparatus of FIGS. 2 and 3.

In one or more embodiments, the brazing material 216 is painted on the lid 208 so that each or at least one of the plurality of wettable regions 214 has a dimension no less than a spacing between two adjacent fins of the fin pack. In one or more embodiments, as shown in FIG. 4, each or at least one of the plurality of wettable regions 214 has no dimension larger than the spacing between five adjacent fins. In one or more embodiments, each of the plurality of wettable regions 214 has no dimension larger than the spacing between two adjacent fins.

Figure 5:
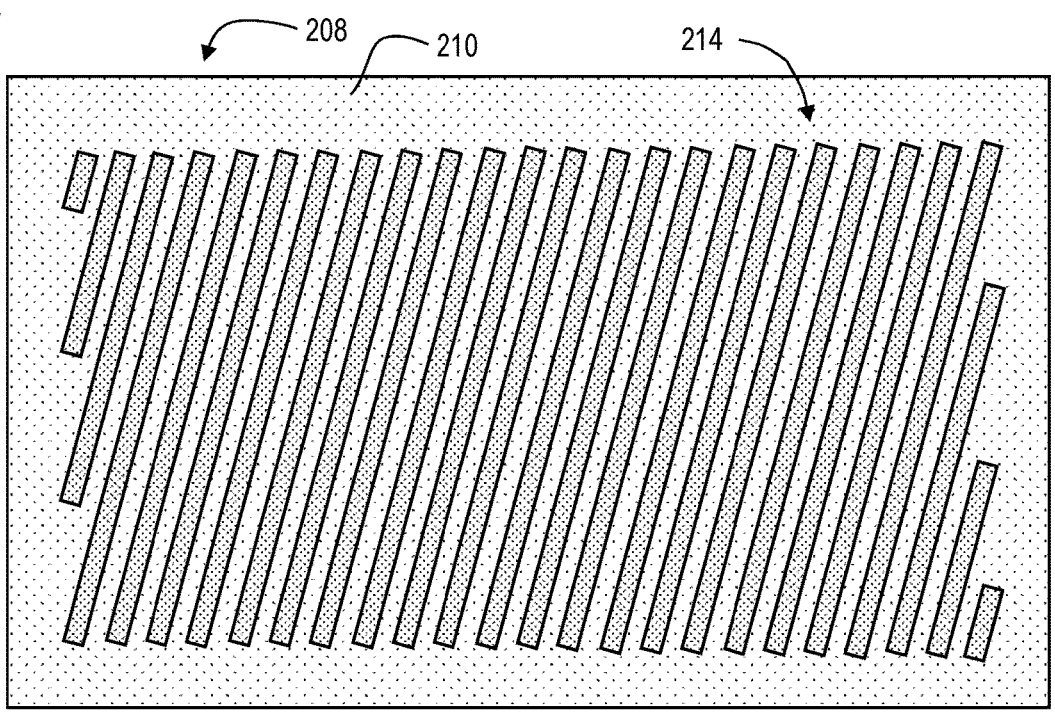
FIG. 5 depicts in a bottom schematic view another exemplary embodiment of a lid for use in the apparatus of FIGS. 2 and 3.

In one or more embodiments, as shown in FIG. 5, each of the plurality of wettable regions 214 is disposed at an angle across the edges of the parallel plates. In embodiments such as the exemplary embodiment shown in FIG. 5, the fins would be oriented with their long edges running left-to-right across the stripes of brazing material.

Figure 6:
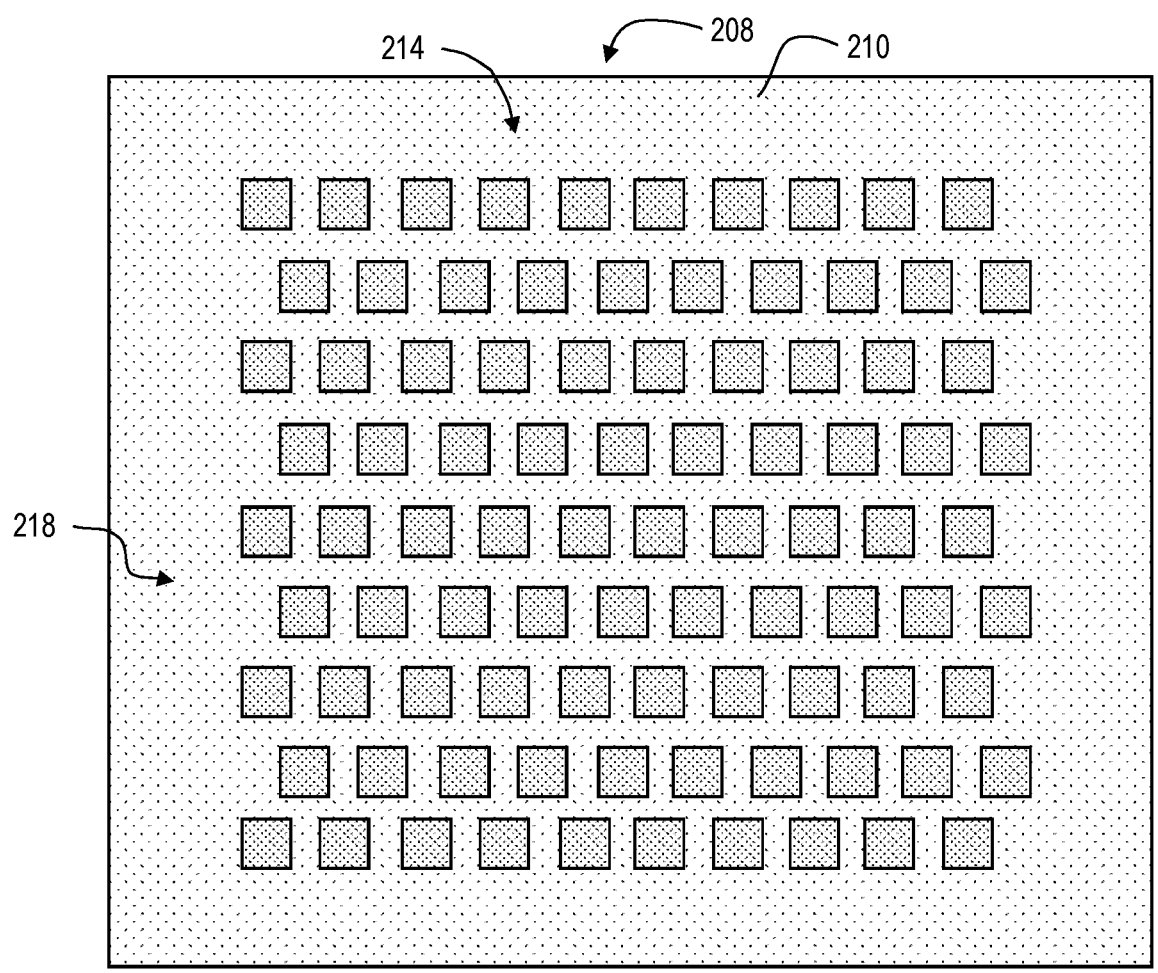
FIG. 6 depicts in a bottom schematic view another exemplary embodiment of a lid for use in the apparatus of FIGS. 2 and 3.

FIG. 6 depicts an embodiment in which the plurality of wettable regions 214 are arranged in rows 218, and the regions of each row are offset along the row relative to the regions of each adjacent row. In embodiments such as the exemplary embodiment shown in FIG. 6, the fins would be oriented with their long edges running up-to-down across the staggered rows. Thus, each fin could be assured of contacting a region of brazing material.

In one or more embodiments, the rows 218 are spaced apart by a distance no more than twice a spacing between two adjacent fins.

In one or more embodiments, the rows 218 are spaced apart by a distance no less than twice a spacing between two adjacent fins.

In one or more embodiments, each or at least one of the rows 218 is of a width no less than twice a spacing between two adjacent fins.

Figure 7:
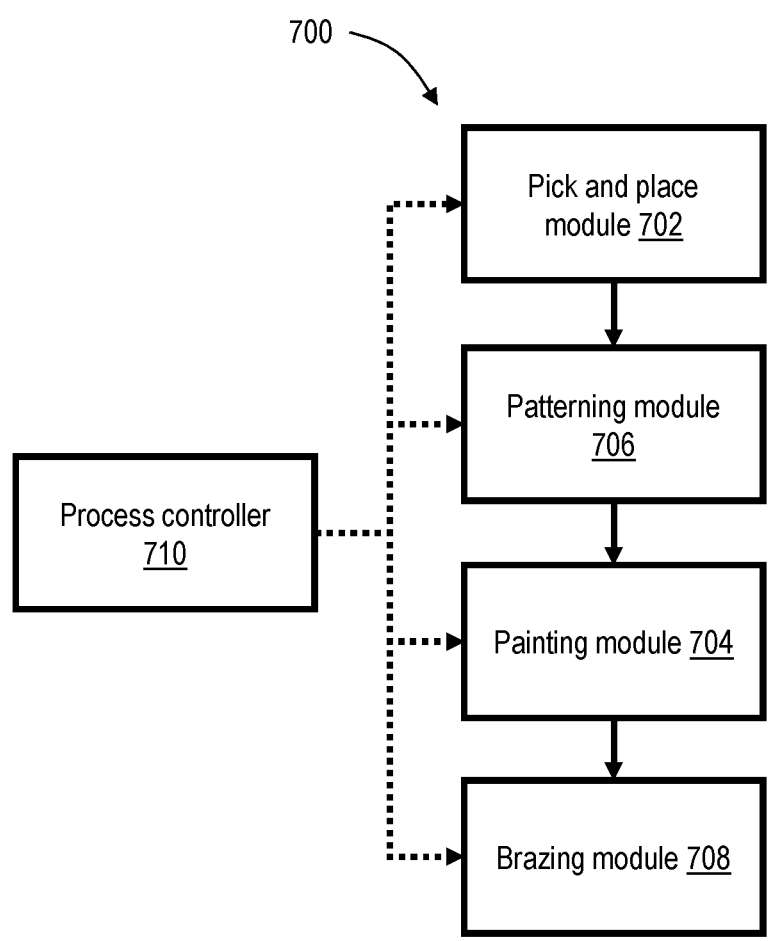
FIG. 7 depicts in a schematic view modules of a computerized manufacturing system suitable for implementing the method of FIG. 1.

It will be understood that the method 100 can be accomplished manually, or by a computerized manufacturing system 700 (as shown in FIG. 7) that incorporates various modules, e.g., a pick-and-place module 702 that obtains the lid and a painting module 704 that paints the lid with the brazing material. Further, in one or more embodiments the system also incorporates an optional patterning module 706 that marks the lid 208 with the non-wetting agent, or that mechanically roughens or embosses the lid, in order to form the negative regions 210 that resist wetting by the brazing material 216 when the assembly is heated to melt the brazing material. These modules can be arranged in any configuration, with the action of the patterning module (if present) taking place before the action of the painting module. Additionally, the system also can incorporate a brazing module 708 that heats the lid, the fin pack, and the brazing material to solidify brazed joints between the fin pack and the lid. In the computerized manufacturing system 700, the various modules 702, 704, 706, 708 all are controlled to operate according to computer executable instructions running in a process controller 710.

Figure 8:
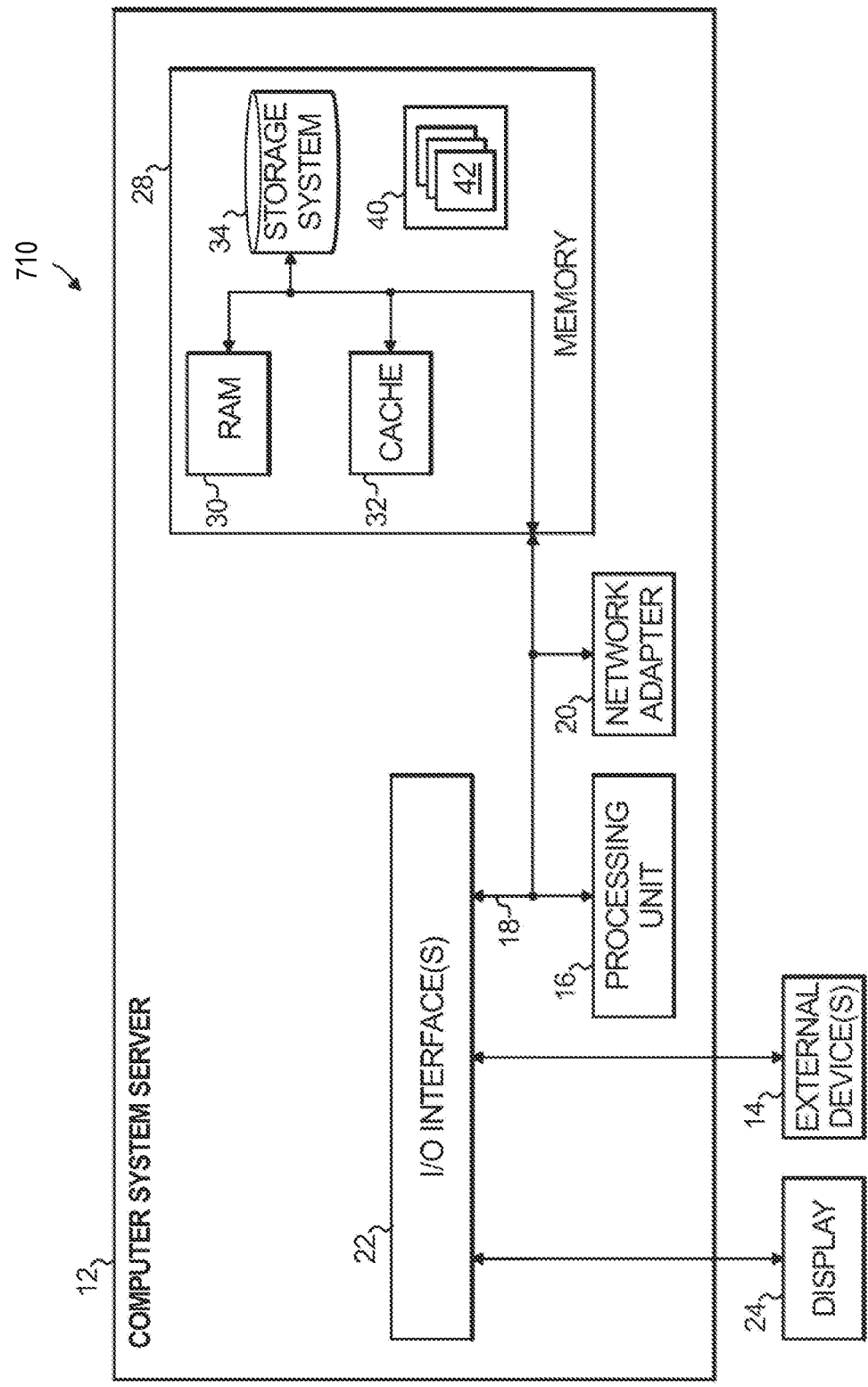
FIG. 8 depicts a process controller of the computerized manufacturing system of FIG. 7.

FIG. 8 depicts details of an exemplary process controller 710. Referring now to FIG. 8, process controller 710 is only one example of a suitable device for controlling implementation of the method 100 and is not intended to suggest any limitation as to the scope of use or functionality of embodiments of the invention described herein. Regardless, process controller 710 is capable of being implemented and/or performing any of the functionality set forth hereinabove.

In process controller 710 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 8, computer system/server 12 in process controller 710 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Once manufactured, the apparatus is configured to enable the flow of coolant through the fin pack. One example of the coolant is water. The concepts disclosed herein are readily adapted to use with other types of coolant. For example, the coolant may comprise deionized water, glycol/water solutions, a brine, a dielectric liquid, a fluorocarbon liquid, a liquid metal, or other coolant, or refrigerant.

In some applications, the plenum and fin pack is formed from a thermally conductive material. An exterior surface of the plenum and fin pack can be arranged in contact (or conductive communication) with the heat-generating components. The coolant, typically water treated with chemicals to avoid corrosion, flows through the plenum and fin pack. Heat from the components is transferred to the thermally conductive material and then to the coolant in the plenum. The coolant flowing through the plenum transports the heat away from the components, thereby keeping the components cool.

Recapitulation:

According to some embodiments, a method comprises at 102 obtaining a lid 208 to be attached to a fin pack 202 of parallel plates 204 that protrude from a base 206, and at 106 painting the lid with the brazing material 216 only in a plurality of wettable regions 214. In one or more embodiments the method further comprises at 104 defining on the lid a plurality of negative regions 210 that will not be wetted when the brazing material 214 is melted, at 108 obtaining the fin pack 202, at 110 positioning the lid 208 against the fin pack 202, opposite the base 206, with portions of the plurality of wettable regions 214 contacting edges of the parallel plates 204, and at 112 brazing the lid to the fin pack, without intrusion of the brazing material 216 between the parallel plates 204.

According to some embodiments, an apparatus comprises a fin pack 202 of parallel plates that protrude from a base 206, a lid 208 to be attached to the fin pack 202 opposite the base, and a brazing material 216 that is painted onto the lid 208 only in a plurality of wettable regions 214, wherein the lid is positioned against the fin pack, opposite the base, with portions of the plurality of regions contacting edges of the parallel plates, wherein the lid is brazed to the fin pack without intrusion of the brazing material between the parallel plates.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Thus, considering FIGS. 1, 7, and 8, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified physical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method comprising:
   obtaining a lid to be attached to a fin pack of parallel plates that protrude from a base;
   defining negative regions of the lid that separate a plurality of wettable regions, wherein the plurality of wettable regions are arranged in rows, and the wettable regions of each row are offset along the row relative to the wettable regions of each adjacent row, wherein the rows are spaced apart by a distance no less than twice a spacing between facing surfaces of two adjacent fins;

painting the lid with a brazing material only in the plurality of wettable regions;

obtaining the fin pack of parallel plates protruding perpendicularly from the base;

positioning the lid against the fin pack, opposite the base, with portions of the brazing material, on the plurality of wettable regions, contacting edges of the parallel plates; and brazing the lid to the fin pack.

2. The method of claim 1 wherein the lid is positioned with each of the plurality of wettable regions disposed at an angle across the edges of the parallel plates.

3. The method of claim 1 wherein at least one of the rows is of a width no less than twice a spacing between two adjacent fins.

* * * * *